United States Patent [19]
Mouner

[11] Patent Number: 5,220,457
[45] Date of Patent: Jun. 15, 1993

[54] VISUAL COMPUTE DESIGN PERMUTATION APPARATUS

[76] Inventor: John Mouner, 205 Adams Ave., Staten Island, N.Y. 10306

[21] Appl. No.: 845,321

[22] Filed: Mar. 3, 1992

[51] Int. Cl.$^5$ .............................................. G02B 23/00
[52] U.S. Cl. ....................................... 359/616; 353/1; 354/77; 355/46
[58] Field of Search ............... 355/46, 52, 43; 359/616; 353/1; 354/77

[56] References Cited

U.S. PATENT DOCUMENTS

| | | | |
|---|---|---|---|
| 3,642,342 | 2/1972 | De Larrain | 359/616 |
| 3,661,439 | 5/1972 | Burnside, III et al. | 353/14 |
| 4,731,666 | 3/1988 | Csesznegi | 359/616 X |
| 4,733,960 | 3/1988 | Bennett | 353/1 |

Primary Examiner—Richard A. Wintercorn

[57] ABSTRACT

The apparatus is a visual design system for reliably reproducing kaleidoscope-type images. A design element is fixed rotationally, vertically and horizontally with various gradients in a projection system and illuminated. The resulting image is projected through a bellows, also including various possible configurations. An image receiving system with height and longitudinal adjustment and corresponding gradients receives the image on a translucent viewing screen. The image is received between two kaleidoscope-type mirrors with an adjustable angle therebetween. A camera records the resulting image.

8 Claims, 9 Drawing Sheets

FIG. IA
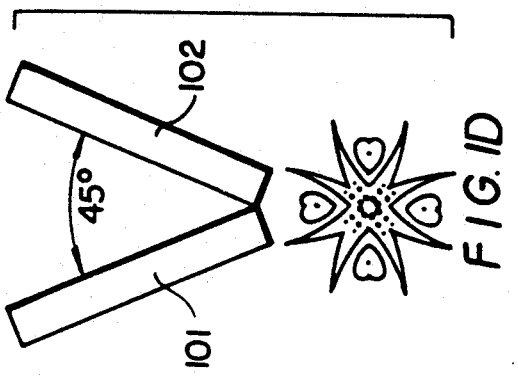
FIG. IB
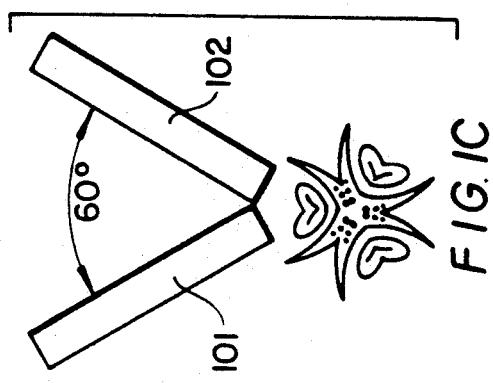
FIG. IC
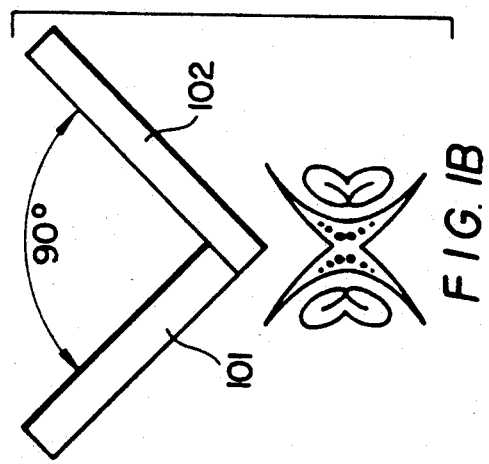
FIG. ID
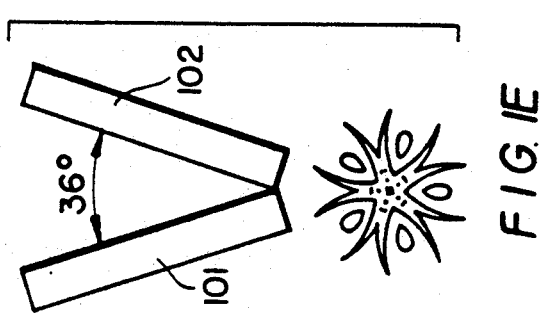
FIG. IE
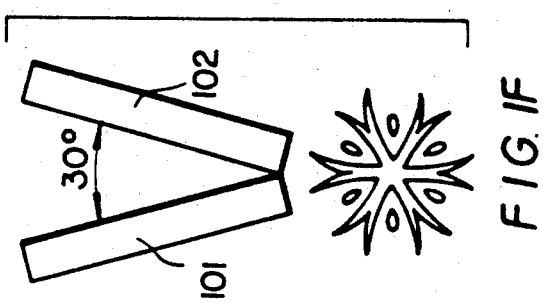
FIG. IF
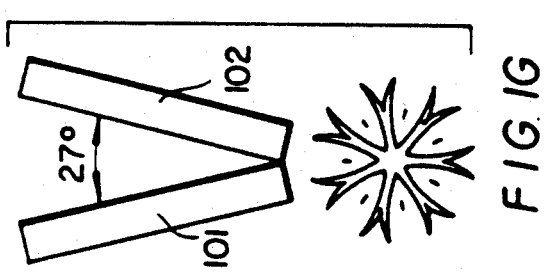
FIG. IG
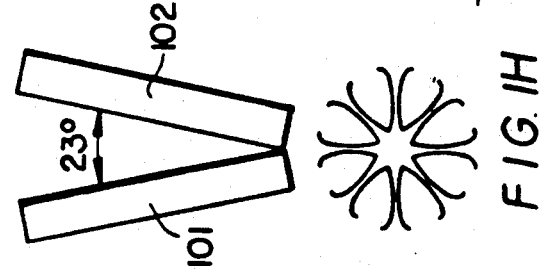
FIG. IH
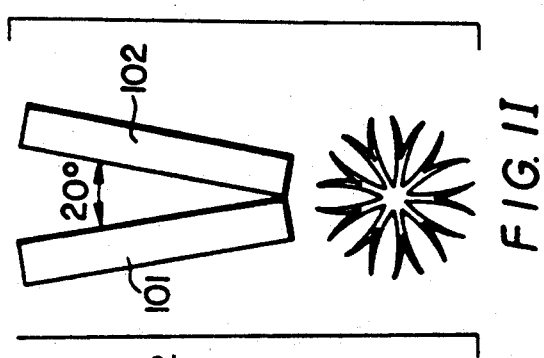
FIG. II

VISUAL COMPUTE DESIGN PERMUTATION APPARATUS

BACKGROUND OF THE INVENTION

Field of the Invention

The invention pertains to an apparatus for reliably reproducing and photographing a design produced by a kaleidoscope-type configuration wherein the configuration is adjustable so as to produce a great variety of designs.

Description of the Prior Art

The kaleidoscope is a well-known toy. The kaleidoscope can create a nearly infinite number of designs. In fact, the common wisdom of childhood holds that one can never get a kaleidoscope to create the same pattern twice.

While U.S. Pat. No. 4,952,004 issued on Aug. 28, 1990 to Baird et al. has made some recent improvements to the kaleidoscope, the kaleidoscope has not progressed to a widely-used professional design instrument in due to its inability to reliably reproduce patterns.

OBJECTS AND SUMMARY OF THE INVENTION

It is therefore an object of this invention to provide a kaleidoscope as a professional design instrument wherein a chosen pattern can be reliably reproduced.

It is therefore a further object of this invention to provide such a professional design instrument with the ability to produce a wide variety of patterns, particularly from two or three dimensional basic design elements or natural objects.

It is therefore a final object of this invention to provide such a professional design instrument with photographic capabilities.

These and other objects are achieved by providing an apparatus with a 360 degree motor-driven rotating wheel, within which a design element is placed, the wheel being locating between a condensing light system and the projection lens; a moveable projection system, placed on a graduated track upon which lenses of different focal lengths may be mounted; and a moveable adjustable image receiver box including two mirrors at an angle to one another for multiply reflecting the image of the basic design element and a camera body for photographing the resulting image.

The above components include various graduated scales for the reliable reproduction of apparatus configuration. The rotating wheel includes a graduated scale showing the degrees of rotation, the graduated track includes a scale showing millimeters of displacement. The image receiver box can be likewise adjusted vertically or horizontally or swivelled. Finally, the angle of the mirrors to each other can be reproducibly adjusted.

BRIEF DESCRIPTION OF THE DRAWINGS

Further objects and advantages of the invention will become apparent from the following description and claims, and from t he drawings, wherein:

FIG. 1A shows a basic unreflected design element.

FIGS. 1B through 1I illustrate mirror relations and the resulting images formed from the basic design element of FIG. 1A.

DETAILED DESCRIPTION OF THE PREFERRED EMBODIMENT

Figure 2:
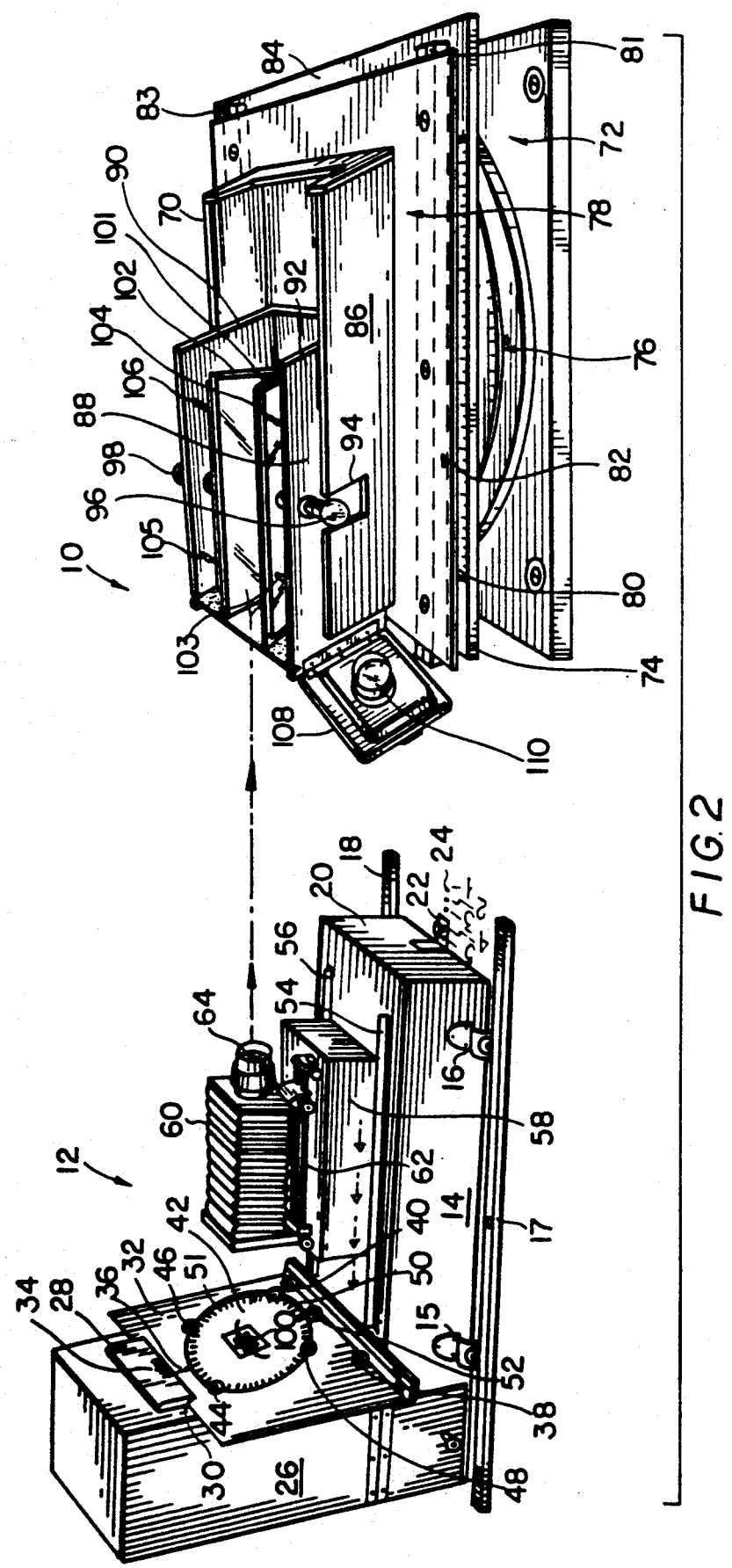
FIG. 2 is a front perspective view of an embodiment of the present invention.

Referring now to the drawings in detail wherein like numerals refer to like elements throughout the several views, FIG. 1A discloses an illustrative design element 100. FIGS. 1B through 1I illustrate various patterns which may be created by placing mirrors 101, 102 at different angles (wherein the various illustrated angles are integer divisions of 360 degrees) to each other. While not directly illustrated in these FIGS., it should be obvious that the vertical and horizontal translation of the mirrors 101, 102 with respect to design element 100 can greatly change the resulting image.

Figure 3:
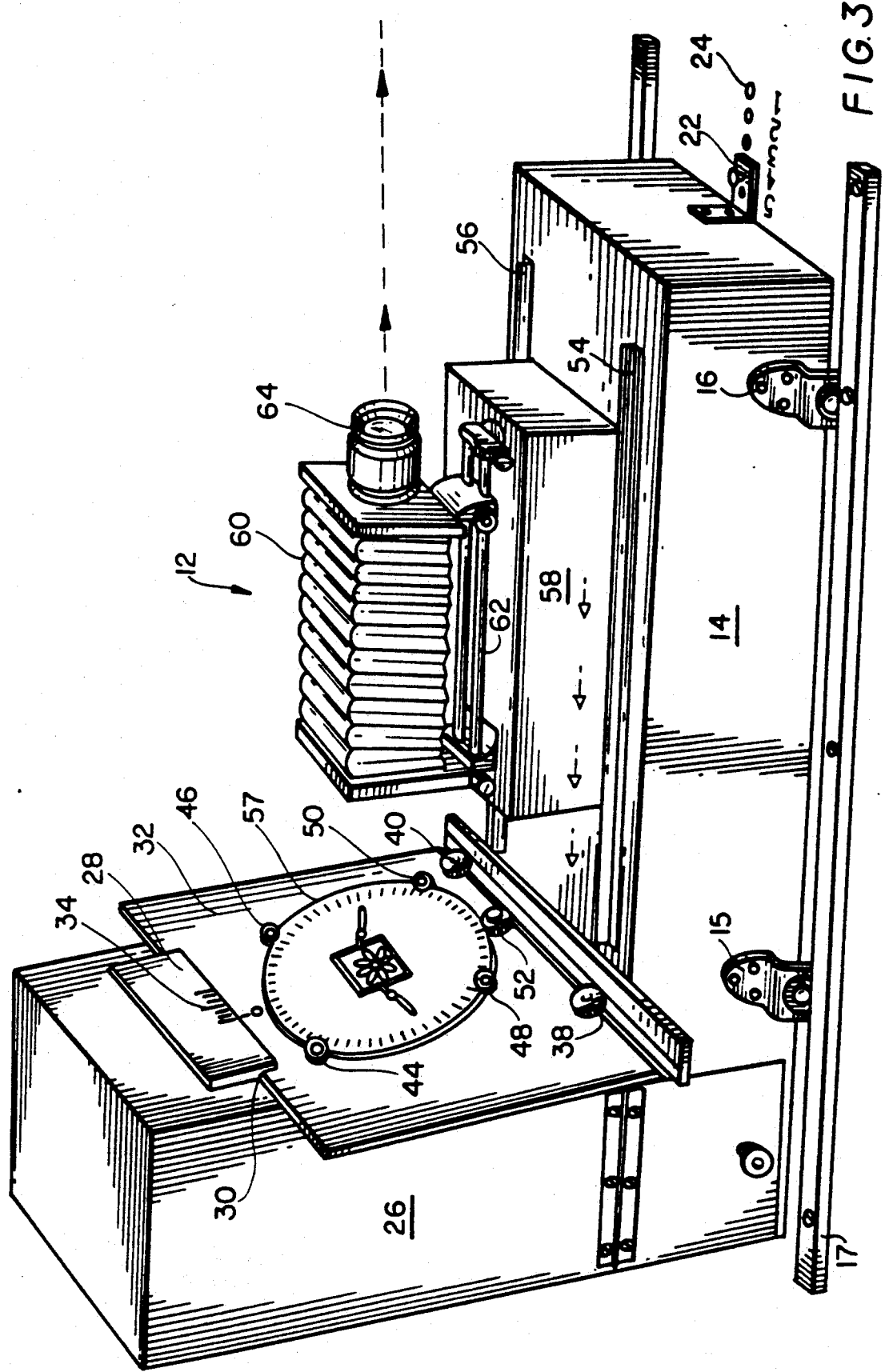
FIG. 3 is a front perspective view of the projection system of an embodiment of the present invention.

FIG. 2 illustrates a basic embodiment of the apparatus 10. Projection system 12 (also see FIG. 3) includes a body 14 with lateral flanges 15, 16 which slidably engage rails 17, 18 which are fixed to a ground surface (such as a table or other platform). Forward end 20 of body 14 further includes an L-connection 22 which is adjustably positioned in pre-selected and numbered apertures 24 thereby providing reproducibly adjustable positions for body 14. Body 14 further includes upright portion 26 with a protruding element 28 with a channel 30 therein in which easel 32 laterally slides. Element 28 includes a scale 34 which variably aligns with a tick mark 36 on easel 32. The lower portion of easel 32 is engaged by wheels 38, 40 which secure easel 32 within a groove to upright portion 26. Easel 32 further includes a rotatable pallet 42 secured thereto by rotating slotted wheels 44, 46, 48, 50. Pallet 42 includes a protractor type gradient 51 which is selectively aligned with tick mark 36 so as to properly orient design element 100. Pallet 42 is rotated by motor driven friction drive wheel 52 connected to a small motor (not shown) rear to easel 32. Upright portion 26 may include a projection lamp system (to be illustrated) where the bulb may be swung away to be replaced by an electronic flash bulb when a stronger light source is needed. (The flash bulb is attached to the end of a plastic tube and slides into a position vacated by the projection bulb.) Body 14 further includes tracks 54, 56 upon which bellows support 58 slidably rests. Bellows 60 includes an adjustable track 62 and a detachable lens 64 of a pre-selected focal length.

Figure 4:
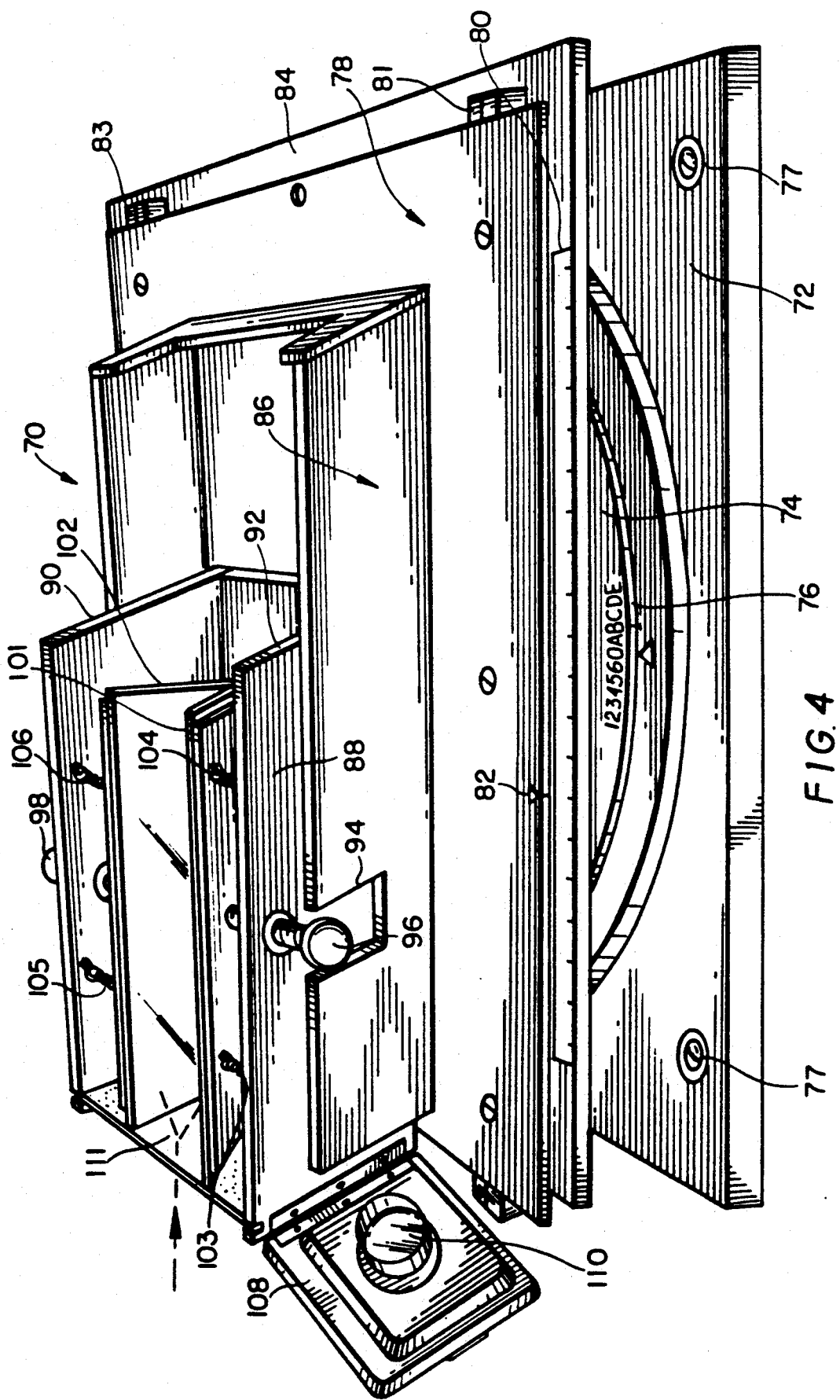
FIG. 4 is a front perspective view of the image receiver box of an embodiment of the present invention.
Figure 5:
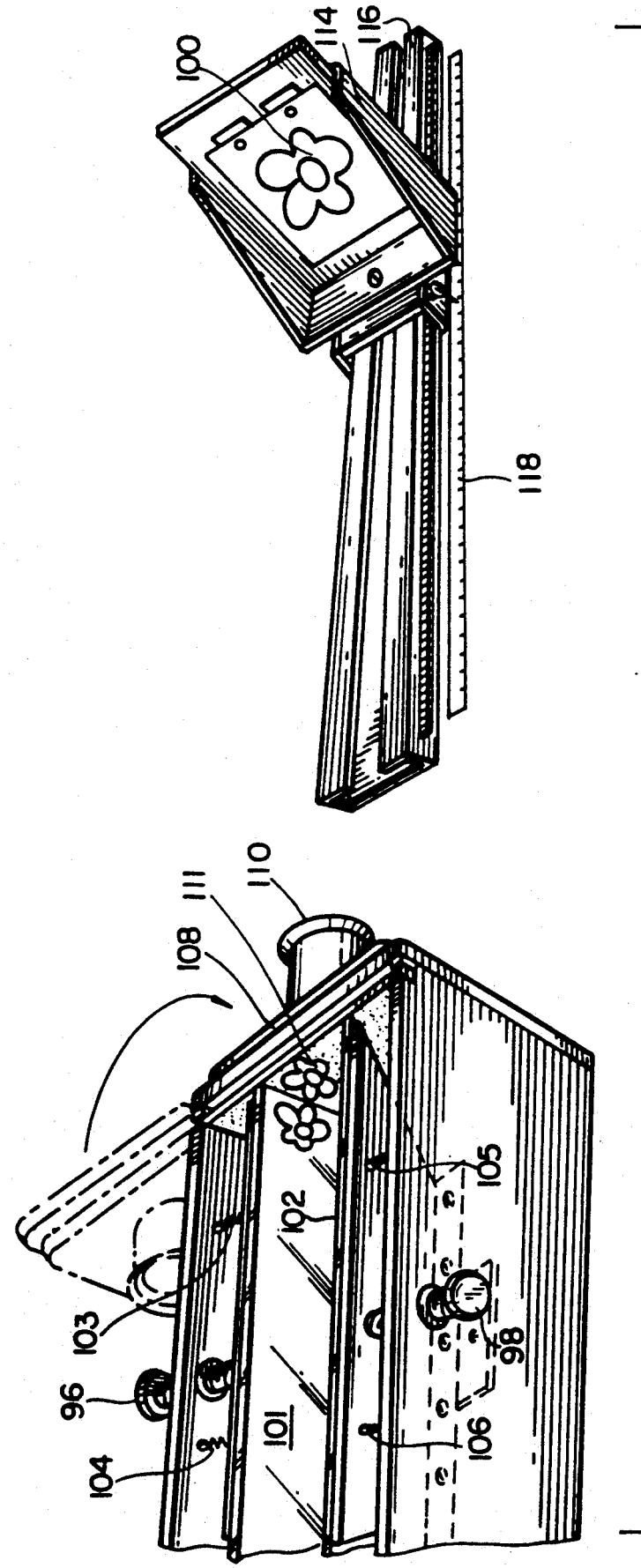
FIG. 5 is a perspective view of an alternate implementation of the image receiver box.
Figure 10:
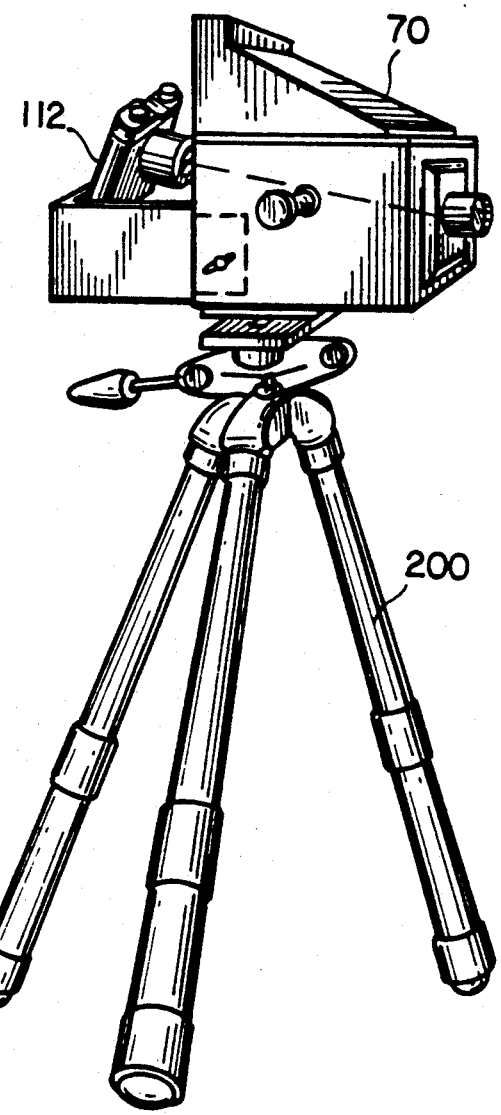
FIGS. 10 and 11 are perspective views, partially in crosssection, of a portable image receiver box.

The image of the design element 100 is projected through bellows 60 and lens 64 to image receiver box 70 (also see FIG. 4). Image receiver box 70 includes a base 72 fixably secured to the ground with rotational adjustment implemented by a "lazy-susan" apparatus 74 with a gradient scale 76. Height adjustment is made by using a precision scissor action lift apparatus 73 or any other adjustable platform (see FIG. 6). Base 72 is secured by bolts 77 to scissor lift apparatus 73. Above lazy-susan apparatus 74 is platform 84 with a longitudinal gradient scale which is selectively aligned with tick marks 82 on metal sliding plate 78 attached to two sliding rails 81, 83 (see FIG. 4). Scissor left apparatus 73 should be noted when in use in the compute mode in any of the three stated positions (see FIG. 8). Measurements are taken from platform 72 to table 124 to use as a reference guide number to repeat the same design or a close approximation thereof, if need be. Three-sided support formation 86 is attached to sled 84. Image receiver box 88 fits into formation 86. Image receiver box 88 includes sidewalls 90, 92 with aperture 94 through which adjustment bolts 96, 98 adjustably urge mirrors 101, 102 (introduced in FIGS. 1B et seq.) to different angles. Elastic means 103, 104, 105, 106 urge mirrors 101, 102 towards sidewalls 90, 92. The interior end of image receiver box 88 includes hinged end 108 upon which receiving lens 110 is mounted to receive an image of design element 100 (either two or three dimensional) and project the image onto rear projection screen material 111, which in turn, provides an image for mirrors 101, 102. As illustrated in FIGS. 5 and 10 (the lens is used only in modes as in FIGS. 5 and 10 only), the image receiver box 88 provides a mounting for camera 112.

By adjusting (and recording) the selection of image size, aperture 24, the position of bellows support 58, the front and rear position of bellows 60 on track 62, the focal length and focus setting of lens 64, the height of bolts 77, the setting of gradient 34 and protractor gradient 51, the height of platform 72 from table 124, the setting of gradients 76 and 80, the position of knobs 96, 98, and, of course, the selected design element, an image may be faithfully reproduced.

FIG. 5 illustrates an alternative embodiment with the design element 100 mounted on a mount 114 on a rail 116 with a gradient 118.

Figure 6:
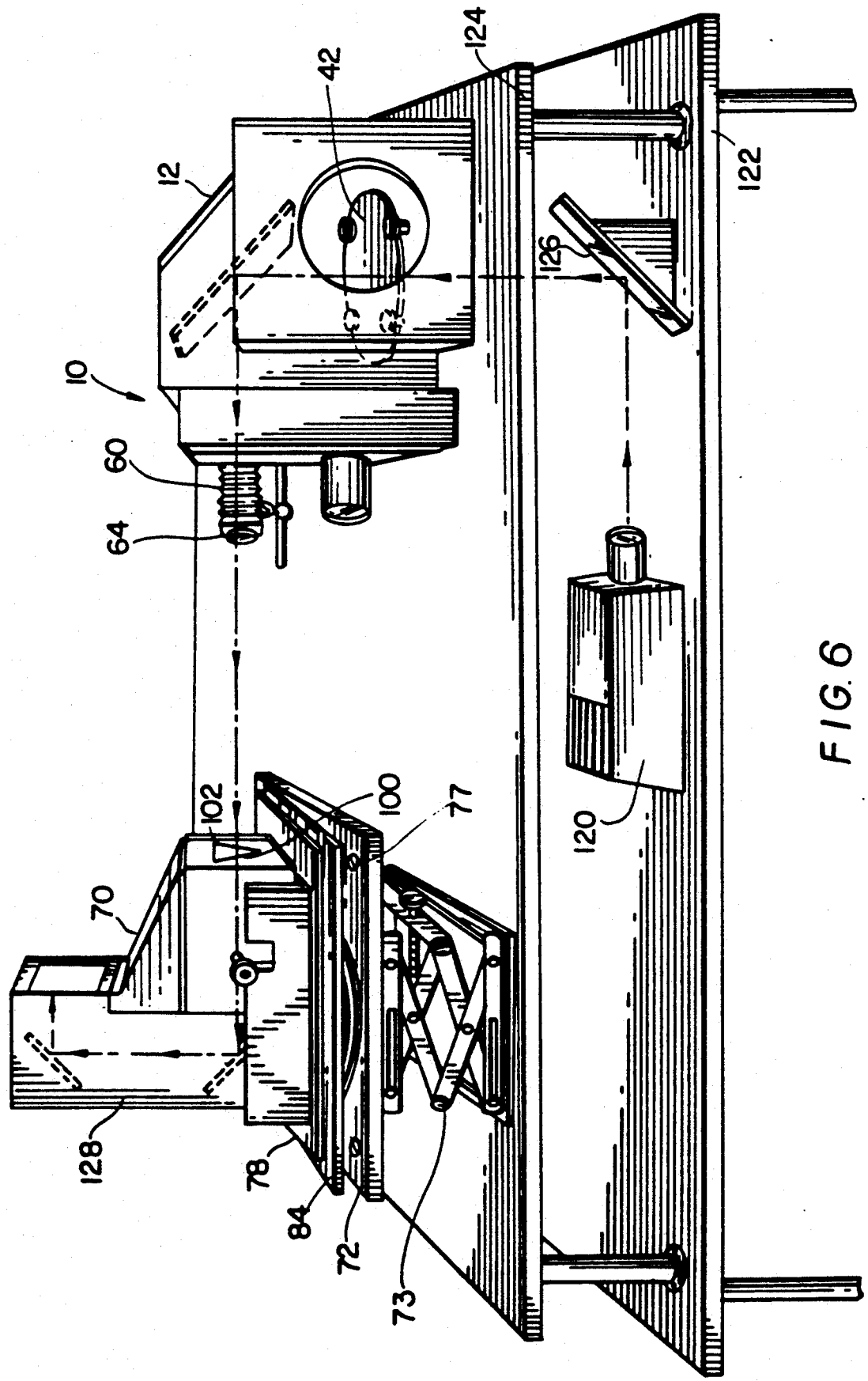
FIG. 6 is a perspective view, partially in phantom, of an alternative embodiment of the invention.

FIG. 6 illustrates another alternative embodiment wherein the projection lamp 120 is placed between two platforms 122, 124 to illuminate a transparent design element 100 on pallet 42 via mirror 126. Camera 112 is replaced with a viewer 128.

Figure 7:
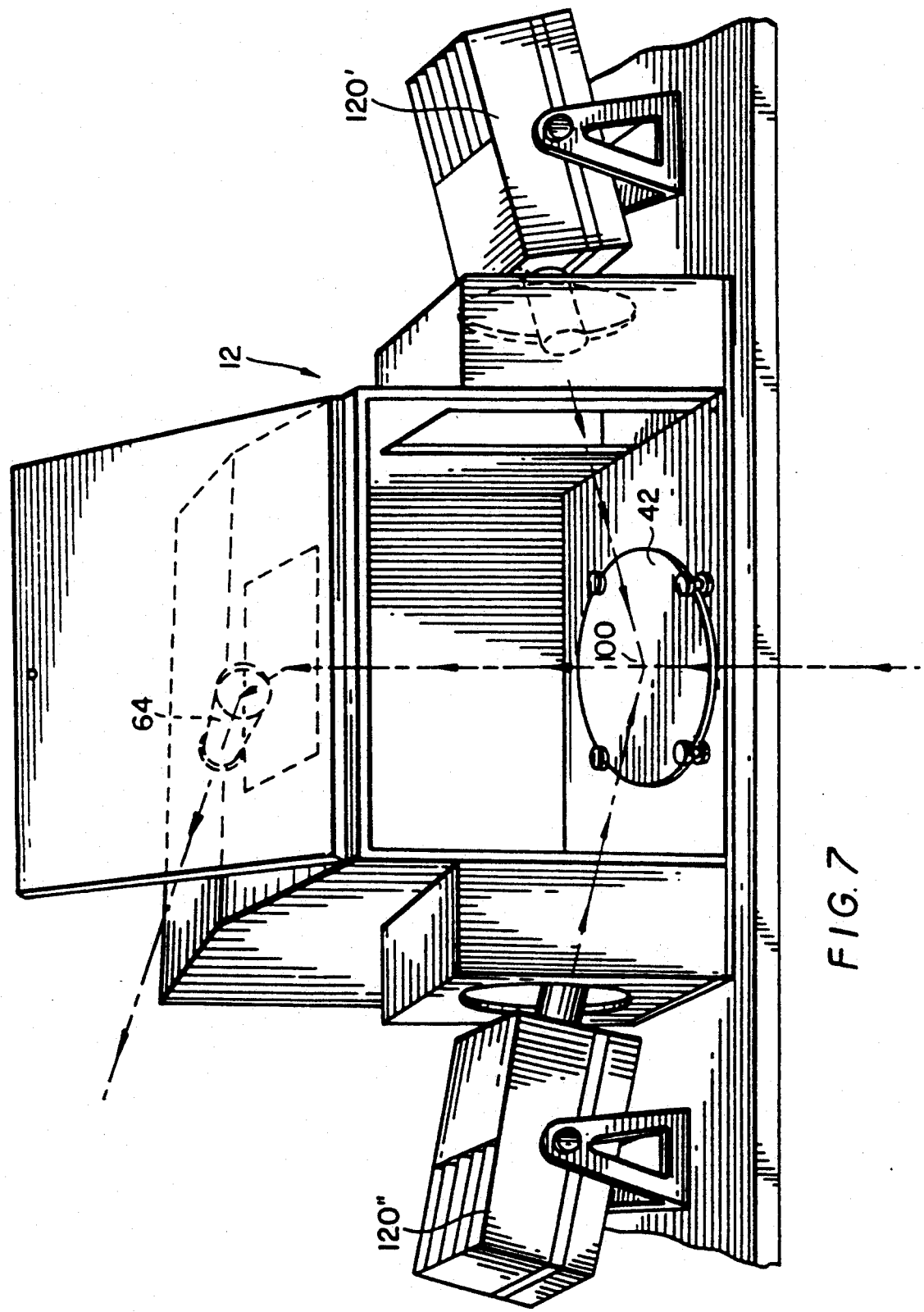
FIG. 7 is a perspective view, partially in phantom, of an alternative projection system of the invention.

FIG. 7 illustrates an alternative projection system 12 for an opaque design element using projection lamps 120' and 120".

Figures 8, 9:
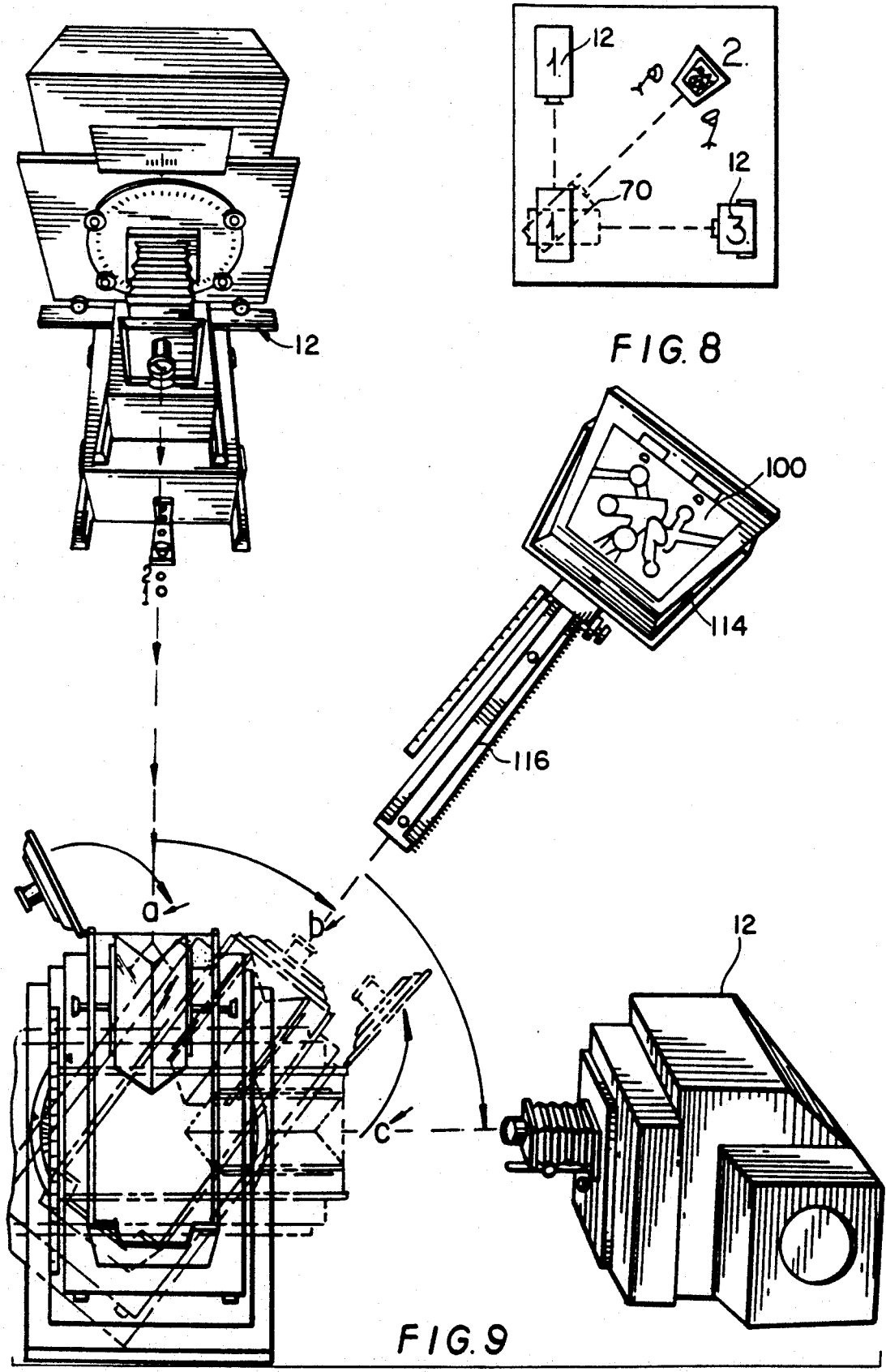
FIG. 8 is a diagram of the invention using multiple projection systems.
FIG. 9 is a perspective view of the embodiment of the invention diagrammed in FIG. 8 using multiple projection systems.

FIGS. 8 and 9 illustrate a hybrid embodiment with a swivelled image receiver box 70, two projection systems 12, and a rail 116 with a mount 114 (as illustrated in FIG. 5).

FIG. 10 illustrates an image receiver box 70 with a camera 12, image receiver box 70 being mounted on mounted on a tripod 200.

Figure 11:
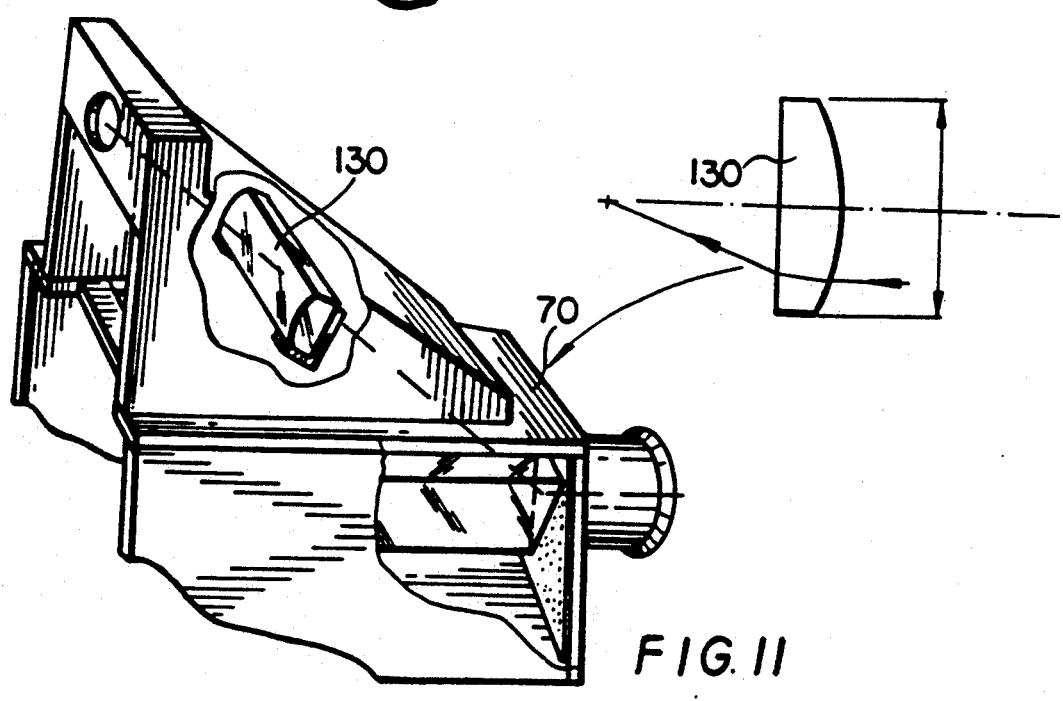

FIG. 11 illustrates the use of a plano-convex lens 130 to provide a viewing apparatus for image receiver box 70.

As previously described, the user is able to reliably reproduce and photograph patterns by setting and recording the various aforementioned adjustments and selections of apparatus 10.

Thus the several aforementioned objects and advantages are most effectively attained. Although a single preferred embodiment of the invention has been disclosed and described in detail herein it should be understood that this invention is in no sense limited thereby and its scope is to be determined by that of the appended claims.

What is claimed is:

1. A visual design apparatus including:
   a projection system including means for holding a design element; means for rotating said means for holding, said means for rotating further including a first gradient means; means for illuminating the design element; means for projecting an illuminated image of the design element; and means for adjusting a portion of said projection system, said means for adjusting including a second gradient means;
   an image receiving system including means for receiving the illuminated image from said means for projecting; multiple image reflecting means including at least two mirrors at an adjustable angle to each other; means for adjusting said adjustable angle; means for adjusting a position of said image receiving system, and means for receiving a photographic means oriented toward said multiple image reflecting means.

2. The visual design apparatus of claim 1 including means for vertically and horizontally moving said means for rotating the design element.

3. The visual design apparatus of claim 2 wherein said means for vertically and horizontally moving includes a vertical gradient means, a vertical locking means, a horizontal gradient means and a horizontal locking means.

4. The visual design apparatus of claim 3 wherein said projection system includes lateral extending flange means on a movable body, said flange means engaging fixed rails whereby said movable body can be moved longitudinally toward or away from said image receiving system.

5. The visual design system of claim 4 wherein said image receiving system includes vertical adjustment means, a vertical adjustment gradient, and a vertical locking adjustment locking means.

6. The visual design system of claim 5 wherein said image receiving system includes rotational adjustment means, a rotational adjustment gradient, and a rotational locking adjustment locking means.

7. The visual design system of claim 6 wherein said image receiving system includes a longitudinal horizontal adjustment means, a longitudinal horizontal adjustment gradient, and a longitudinal horizontal locking means.

8. The visual design system of claim 7 wherein said projection system includes a bellows mount means longitudinally adjustable with respect to said movable body, and a bellows means mounted on said bellows mount means for projecting the image toward said image receiving system.

* * * * *